United States Patent [19]

Nishimura et al.

[11] Patent Number: 4,650,849

[45] Date of Patent: Mar. 17, 1987

[54] PHOTOSENSITIVE CURABLE RESIN COMPOSITION

[75] Inventors: Yoshiaki Nishimura, Tokyo; Hiroshige Okinoshima, Gunma; Seiya Yamada, Gunma; Tsutomu Kashiwagi, Gunma, all of Japan

[73] Assignee: Shin-Etsu Chemical Co., Ltd., Tokyo, Japan

[21] Appl. No.: 727,359

[22] Filed: Apr. 25, 1985

[51] Int. Cl.$^4$ ............................................ C08G 77/04
[52] U.S. Cl. ........................................ 528/26; 528/31
[58] Field of Search ................................... 528/26, 31

[56] References Cited

U.S. PATENT DOCUMENTS

| | | | |
|---|---|---|---|
| 4,293,397 | 10/1981 | Sato et al. | 528/26 X |
| 4,338,426 | 7/1982 | Sato et al. | 528/26 |
| 4,391,963 | 7/1983 | Shirahata | 528/37 |
| 4,551,522 | 11/1985 | Fryd et al. | 528/351 |
| 4,558,117 | 12/1985 | Nakano et al. | 528/184 |

*Primary Examiner*—Lucille M. Phynes
*Attorney, Agent, or Firm*—Toren, McGeady and Goldberg

[57] ABSTRACT

The organosilicon-containing polyamic acid of the invention is a reaction product of the reactants including (1) an organosilicon compound having ethylenic unsaturation and amino-substituted hydrocarbon group, (2) a tetracarboxylic acid dianhydride and (3) a polyamino compound in an organic solvent. The polyamic acid as such and a composition comprising the same in combination with a mercapto-containing compound and/or a photosensitizer are useful as a photosensitive precursor of a polyimide resin usable in photolithographic pattern reproduction.

2 Claims, No Drawings

PHOTOSENSITIVE CURABLE RESIN COMPOSITION

BACKGROUND OF THE INVENTION

The present invention relates to a novel photosensitive curable resin precursor usable per se in the preparation of a printing plate, photoresist film and the like or, more particularly, to a photocurable composition of a resin precursor having excellent storability and capable of forming a patterned surface layer of a cured polyimide resin having a high resolving power of the pattern reproduction and good adhesive strength to the surface of a substrate on which the composition has been cured by the irradiation with actinic rays. Still more particularly, the present invention relates to a resin precursor which is a photosensitive organosilicon-containing polyamic acid as well as a composition comprising the same curable to give a polyimide film having the above mentioned advantageous characteristics.

As is well known, a great deal of investigations have been undertaken in the prior art for obtaining a patterned layer of a polyimide resin by use of a photosensitive precursor composition of the polyimide resin prepared by imparting photosensitivity to a precursor of a polyimide resin and reported in, for example, Japanese Patent Publication No. 49-17374 and Japanese Patent Kokai Nos. 52-13315, 54-70820, 54-145794, 55-135139, 56-38038, 57-108158, 57-212432 and 58-59440. Each of these known resin precursors and compositions in the prior art is not quite satisfactory in one or more respects including the stability of the composition in storage, resolving power of the patterned layer formed of the composition by the techniques of the photolithography, adhesive strength of the film of the cured resin to the surface of the substrate on which the resin precursor or composition has been cured, and so on.

SUMMARY OF THE INVENTION

It is therefore an object of the present invention to provide a novel photosensitive resin precursor as well as a composition comprising the same capable of forming a polyimide resin and having good storability from which a patterned surface layer of a cured polyimide resin can be obtained. The polyimide resin film formed thereof has an excellent resolving power of fine pattern reproduction and good adhesive strength to the surface of the substrate on which it has been cured by the exposure to actinic rays without affecting the excellent properties inherent to polyimide resins such as heat resistance, mechanical strength, anti-chemical resistance, electric insulation and the like.

Thus, the novel resin precursor of an organosilicon-containing polyimide resin provided by the invention completed as a result of the extensive investigations is an organosilicon-containing copolymeric polyamide with carboxyl groups or so-called polyamic acid which is a reaction product of following three reactants, i.e.

(a-1) an organosilicon compound represented by the general formula

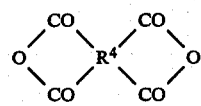  (I)

in which R is a hydrogen atom or a methyl group, $R^1$ is a group selected from the class consisting of substituted or unsubstituted monovalent hydrocarbon groups including alkyl and aryl groups and alkoxy groups, $R^2$ is a divalent organic group specified below, $R^3$ is a divalent hydrocarbon group, a and b are each a positive number not exceeding 3 and c is zero or a positive number not exceeding 2 with the proviso that a+b+c is a positive number not exceeding 4 and d is zero or 1, (a-2) a tetracarboxylic acid dianhydride represented by the general formula

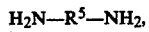  (II)

in which $R^4$ is a tetravalent hydrocarbon group, and (a-3) a polyamino compound represented by the general formula $$H_2N-R^5-NH_2,$$  (IIIa)

which is a diamino compound, or

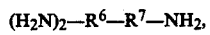  (IIIb)

which is a diaminoamide compound, in which $R^5$ is a divalent organic group, $R^6$ is a tervalent hydrocarbon group and $R^7$ is a sulfonyl group $-SO_2-$ or a carbonyl group $-CO-$, in an organic solvent.

Although the above described polyamic acid is per se photocurable by the irradiation with actinic rays, it is sometimes more advantageous that the polyamic acid is used as a component of a composition which comprises:

(a) the polyamic acid described above;

(b) an organic compound having at least two mercapto groups $-SH$ in a molecule in such an amount that the molar ratio of the mercapto groups contained therein to the unsaturationcontaining group $(CH_2=CR-R^2_d-)$ in the reactant (a-1) for the polyamic acid as the component (a) is up to equimolar.

In particular, the above described composition of the invention is preferably admixed with a photosensitizer in an amount of up to 5 parts by weight per 100 parts by weight of the total amount of the components (a) and (b).

DETAILED DESCRIPTION OF THE PREFERRED EMBODIMENTS

As is described above, the resin precursor of the invention, which is also the component (a) in the inventive photocurable composition, is an organosilicon-containing polyamic acid which is prepared by the reaction of an oorganosilicon compound, i.e. reactant (a-1), represented by the general formula (I), a tetracarboxylic acid dianhydride, i.e. reactant (a-2), represented by the general formula (II) and a polyamino compound, i.e. reactant (a-3), represented by the general formula (IIIa) or (IIIb) in an organic solvent.

The organosilicon compound as the reactant (a-1) should necessarily have at least one unsaturation-containing group $(CH_2=CR-R^2_d-)$ and at least one amino-substituted hydrocarbon group $(H_2N-R^3-)$ simultaneously in a molecule. The group denoted by the symbol R is a hydrogen atoms or a monovalent hydrocarbon group which is preferably a methyl group. The group denoted by the symbol $R^1$, assuming that the suffix c is not zero, is selected from the class consisting of monovalent hydrocarbon groups including alkyl groups such as methyl, ethyl and propyl groups, cycloalkyl groups such as cyclohexyl group and aryl groups such as phenyl and tolyl groups and alkoxy groups such as methoxy and ethoxy groups. Those substituted groups obtained by the replacement of a part or all of the hydrogen atoms in the above named hydrocarbon and alkoxy groups with substituent atoms or groups such as halogen atoms, glycidyloxy groups, cyano groups and the like can also be suitable as $R^1$. The groups denoted by $R^1$ in a molecule may not necessarily be the same ones but may be different from each other.

The symbols $R^2$ and $R^3$ each denote a divalent organic group which is preferably a divalent hydrocarbon group selected from the class consisting of polymethylene groups of the formula $-CH_2)_p$, in which p is a positive integer, propylene group of the formula $-CH_2-CHMe-$, in which Me is a methyl group and 1,4-phenylene group. A divalent esteric group of the formula $-CO-O-C_3H_6-$ is also suitable as the group $R^2$. The suffixes a and b are each a positive number not exceeding 3 and c is zero or a positive number not exceeding 2 with the proviso that a+b+c is a positive number not exceeding 4. The suffix d is zero or 1. The organosilicon compound is an organosilane compound when a+b+c is equal to 4 or an organopolysiloxane compound when a+b+c is smaller than 4. Organopolysiloxanes are preferred to organosilanes as the reactant (a-1). The method for the preparation of these organosilicon compounds is well known in the art of organosilicon chemistry.

Several of the particular examples of the organosilicon compound are those expressed by the following structural formulas, denoting methyl, vinyl, phenyl and 3-aminopropyl groups with Me, Vi, Ph and Ap, respectively:

Ap—SiMe$_2$—CH$_2$)$_3$Vi;
Ap—SiMe$_2$—O—SiMe$_2$—O)$_m$SiMe$_2$—Vi, in which m is a positive integer;
Ap—SiMe$_2$—O—SiMe$_2$—O)$_n$SiMe$_2$—C$_3$H$_6$—O—CO—CMe=CH$_2$, in which n is a positive integer;
Ap—SiMe$_2$—O—SiMeVi$_2$;
Ap—SiMe$_2$—SiVi$_3$;
Ap—SiPh$_2$—O—SiPh$_2$—Vi;
Ap—SiMe$_2$—O—SiMe(—CH$_2$—Vi)$_2$; and
H$_2$N—C$_6$H$_4$—SiMe$_2$—O—SiMe$_2$—Vi.

These organosilicon compounds may be used either singly or as a combination of two kinds or more according to need.

The second reactant (a-2) to form the inventive polyamic acid is a dianhydride of a tetravalent carboxylic acid represented by the general formula (II) in which $R^4$ is a tetravalent hydrocarbon group preferably having at least one aromatic nucleus. Several of the examples, though not limitative, of such a tetracarboxylic acid dianhydride include pyromellitic acid dianhydride, benzophenone tetracarboxylic acid dianhydride, 2,3,6,7-naphthalene tetracarboxylic acid dianhydride, 3,3',4,4'-diphenyl tetracarboxylic acid dianhydride, 2,2',3,3'-diphenyl tetracarboxylic acid dianhydride, 2,2-bis(3,4-dicarboxyphenyl)propane dianhydride and the like. These dianhydride compounds may be used as a combination of two kinds or more according to need.

The third reactant (a-3) to form the polyamic acid is a polyamine compound represented by the general formula (IIIa) or (IIIb). In the formula (IIIa), $R^5$ is a divalent organic group which may be a divalent hydrocarbon group such as alkylene and arylene groups as well as a divalent aliphatic or aromatic group having a sulfone, sulfide or ether linkage in the structure. Particular examples of the compounds in conformity with the general formula (IIIa) and the definition of the symbol $R^5$ include, for example, phenylenediamines, 4,4'-diaminodiphenyl methane, 4,4'-diaminodiphenyl propanes, 4,4'-methylenedianiline, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 2,2-[4-(N-phenylphthalimid-4-oxy)phenyl]propane and the like.

In the general formula (IIIb), $R^6$ is a tervalent hydrocarbon group which is preferably aromatic and $R^7$ is a sulfonyl group $-SO_2-$ or carbonyl group $-CO-$ so that the compound of the general formula (IIIb) is a sulfamide or carbonamide compound. Examples of the compounds in conformity with the general formula (IIIb) and the definitions of the symbols $R^6$ and $R^7$ include, for example, 4,4'-diaminodiphenyl ether 3-sulfonamide, 4,4'-diaminodiphenylmethane 3-sulfonamide, 4,4'-diaminodiphenylsulfone 3-sulfonamide, 4,4'-diaminodiphenyl sulfide 3-sulfonamide, 1,4-diaminobenzene 2-sulfonamide, 4,4'-diaminodiphenylmethane 3-carbonamide, 4,4'-diaminodiphenyl sulfide 3-carbonamide and the like. These compounds may be used as a combination of two kinds or more according to need.

The organosilicon-containing polyamic acid as the resin precursor of the invention can readily be prepared by the reaction of the above described reactants (a-1), (a-2) and (a-3) in an organic solvent such as N-methyl-2-pyrrolidone, N,N-dimethylformamide, N,N-dimethylacetamide and the like. It is usually convenient that the reactants (a-1) and (a-3) are first dissolved in a suitable organic solvent each in an appropriate concentration and the reactant (a-2) is gradually added to the solution at a controlled rate in order to avoid excessive temperature elevation of the reaction mixture since the reaction proceeds exothermically and polyimide linkages may be formed between the reactants when the temperature of the reaction mixture is too high. The temperature should be kept at 100° C. or below or, preferably, 50° C. or below and an external cooling means should be undertaken, if necessary. The amount of the reactant (a-2), i.e. tetracarboxylic acid dianhydride, added to the reaction mixture should be in the range from 0.4 to 0.6 mole or, preferably, about 0.5 mole per mole of the amino groups in the reactants (a-1) and (a-3).

The polyamic acid as the resin precursor of the invention typically has a molecular structure expressed by the following formula:

$$(CH_2=CR-R^2_d-)_2SiR^1-O-SiR^1_2-R^3-NH-CO-$$
$$-R^4(-COOH)_2-CO-NH+CO-R^4(-COOH)_2-CO-R^5-$$
$$-NH\}_mCO-R^4(-COOH)_2-CO-NH-R^3-SiR^1_2-O-$$
$$-SiR^1(-R^2_d-CR=CH_2)_2.$$

Although the above described polyamic acid, which is a novel compound not known in the prior art or not described in any publications, is convertible into a polyimide resin by the irradiation with actinic rays, it is preferable, especially when the polyamic acid has only one unsaturation-containing group (CH$_2$=CR—R$^2_d$—) in a molecule, that the polyamic acid is combined with the component (b) described above to form a composition. The component (b) in such a photosensitive composition is a compound having at least two mercapto groups —SH in a molecule contained in the molecule in the form of, for example, —CH$_2$)$_p$SH, p being a positive integer, such as —C$_3$H$_6$—SH or —CH$_2$—CHSH—CH$_2$—CH$_2$—. It is preferable that the component (b) is an organosilicon compound represented by the general formula $$R^8_e R^9_f SiO_{(4-e-f)/2}. \qquad (IV)$$

In the formula, R$^8$ is a mercapto-substituted hydrocarbon group of the formula —CH$_2$)$_p$SH, p being a positive integer, or —CH$_2$—CHSH—CH$_2$—CH$_2$—, which is a divalent group bonded to the same silicon atom with replacement of the suffix e with e/2, and R$^9$ is a monovalent hydrocarbon group having no aliphatic unsaturation selected from the class consisting of the hydrocarbon groups given previously as the examples of the group denoted by R$^1$ in the formula (I). A part or all of the hydrogen atoms in these hydrocarbon groups may be replaced with substituents such as halogen atoms and cyano groups. The suffix e is a positive number larger than 0.0004 but smaller than 4 and f is zero or a positive number not exceeding 2.5 with the proviso that e+f is larger than 1.1 but not exceeding 4.

Examples of such an organosilicon compound include those expressed by the following structural formulas, denoting methyl, phenyl and 3-mercaptopropyl group with Me, Ph and Mp, respectively:

MeSiMp$_3$;

Me$_2$SiMp$_2$;

HS—CH$_2$—SiMe$_2$—O—(—SiMe$_2$—O—)$_{\overline{q}}$—SiMe$_2$—CH$_2$—SH;

Mp—SiMe$_2$—O—(—SiMe$_2$—O—)$_{\overline{r}}$—SiMe$_2$—Mp;

Me$_3$Si—O—(—SiMeMp—O—)$_{\overline{s}}$—(—SiMe$_2$—O—)$_{\overline{t}}$—SiMe$_3$;

PhSi[—O—SiMe$_2$—O—(—SiMe$_2$—O—)$_{\overline{u}}$—SiMe$_2$—Mp]$_3$;

SiMp$_4$;

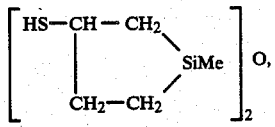

Mp—SiMe$_2$—O—(—SiMe$_2$—O—)$_{\overline{v}}$—(—SiPh$_2$—O—)$_{\overline{w}}$—SiMe$_2$—Mp;

Me$_3$Si—O—(—SiMeMp—O—)$_{\overline{x}}$—(—SiMe$_2$—O—)$_{\overline{y}}$—(—SiMePh—O—)$_{\overline{z}}$—SiMe$_3$;

[—SiMe$_2$—O—(—SiMeMp—O—)$_{\overline{s}}$—]; and $$\left[ \begin{array}{c} HS-CH-CH_2 \\ | \quad \quad \quad \backslash \\ \quad \quad \quad \quad SiMe \\ | \quad \quad \quad / \\ CH_2-CH_2 \end{array} \right]_2 O,$$

in which q, r, t, u, v, w, y and z are each zero or a positive integer and s and x are each a positive integer. Further, usable organopolysiloxane compounds include those composed of trifunctional units of a first type of the formula MeSiO$_{1.5}$, trifunctional siloxane units of a second type of the formula MpSiO$_{1.5}$ and difunctional siloxane units of the formula Me$_2$SiO in a molar ratio of, for example, 60:20:20 regardless of the molecular weight corresponding to liquid compounds to solid ones at room temperature.

Particularly preferable mercapto-containing compounds as the component (b) are those organosilicon compounds obtained by the reaction of the above described reactants (a-2) and (a-3) for the component (a) in about the same manner as in the preparation of the component (a) with, in place of the reactant (a-1), an organosilicon compound represented by the general formula $$[HS—CH_2)_p]_g R^{11}_h (H_2N—R^{12}—)_k SiO_{(4-g-h-k)/2}, \qquad (V)$$

in which R$^{11}$ is selected from the class of the groups given as the examples of the group R$^1$ in the general formula (I), R$^{12}$ is a divalent group seleced from the class of the groups given as the examples of the group R$^2$ in the general formula (I), g and k are each a positive number not exceeding 3 and h is zero or a positive number not exceeding 2 with the proviso that g+h+k is not exceeding 4. It is preferable that the organosilicon compound of the general formula (I) has one and only one amino-containing group (H$_2$N—R$^{12}$—) in a molecule.

Several of the particular examples of the organosilicon compound represented by the general formula (V) include those expressed by the following structural formulas, denoting 3-aminopropyl and 3-mercaptopropyl groups with Ap and Mp, respectively;

Ap—SiMe$_2$—Mp;
Ap—SiMe$_2$—O—SiMe$_2$—Mp;
Ap—SiPh$_2$—O—SiPh$_2$—Mp; and
H$_2$N—C$_6$H$_4$—SiMe$_2$—O—SiMe$_2$—Mp.

Accordingly, the reaction product obtained by the reaction of the reactants (a-2) and (a-3) with the organosilicon compound of the general formula (V) typically has a molecular structure expressed by the formula Mp—SiR$^{11}_2$—O—SiR$^{11}_2$—R$^3$—NH—CO—R$^4$(—COOH)$_2$—

—CO—NH—(—CO—R$^4$(—COOH)$_2$—CO—NH—R$^3$—NH—)$_{\overline{n}}$

CO—R$^4$(—COOH)$_2$—CO—NH—R$^3$—SiR$^{11}_2$—O—SiR$^{11}_2$—Mp.

When the photosensitive composition of the invention is formed of the components (a) and (b), the amount of the component (b) should be in such a range that the molar amount of the mercapto groups in the component (b) does not exceed an equimolar amount to the unsaturation-oontaining group of the formula (CH$_2$=CR—R$^4_d$—) in the component (a). Preferably, the molar ratio of these two types of functional groups, i.e. the mercapto groups in the component (b) to the unsaturation-containing groups in the component (a), should be in the range from 1:1 to 1:10.

It is further preferable in some cases that the inventive photosensitive resin precursor, i.e. the component (a), or the composition composed of the components (a) and (b) is additionally admixed with a photosensitizer as the component (c) when enhancement of the photosensitivity thereof is desired. Various types of known compounds can be used as the photosensitizer in this case including organic peroxides, aromatic ketone compounds, azo compounds and the like. Exemplary of the organic peroxide are peroxyketals such as 1,1-bis(tert-butylperoxy)-3,3,5-trimethyl cyclohexane and 2,2-bis(-tert-butylperoxy) butane, dialkyl and diaryl peroxides such as di-tert-butyl peroxide, tert-butyl cumyl peroxide, dicumyl peroxide and 2,5-dimethyl-2,5-di(tert-butylperoxy) hexane, perester compounds such as tert-butylperoxy benzoate and tert-butylperoxy isopropyl carbonate and diacyl peroxide such as dioctanoyl peroxide and dibenzoyl peroxide. Exemplary of the aromatic ketone compound are acetophenone, benzophenone, benzoin ethyl ether, benzoin isopropyl ether and benzoin butyl ether and exemplary of the azo compound is azobisisobutyronitrile. These compounds may be used as the component (c) either singly or as a combination of two or more of different types according to need.

As to the amount of this component (c) in the inventive composition, no lower limit can be defined since this component is added only according to need although the upper limit thereof should be about 5 parts by weight per 100 parts by weight of the total amount of the components (a) and (b). Usually, the amount should be in the range from 0.1 to 5 parts by weight or, preferably, from 0.2 to 1.0 part by weight per 100 parts by weight of the total amount of the components (a) and (b) in order to obtain a substantial improvement in the photosensitivity of the photosensitive resin precursor or the photosensitive composition of the invention.

The photosensitive composition of the invention can be prepared by uniformly blending the components (a) and (b), optionally, with further admixture of the component (c) each in a calculated or predetermined amount. It is of course optional that the composition is further admixed with various kinds of additives known in the art of photosensitive resinous materials. Several of such additives include, for example, an antioxidant such as pyrocatechol and hydroquinone or a monoether or alkyl-substituted derivative thereof added in an amount of 0.001 to 10% by weight or, preferably, from 0.002 to 1% by weight with an object to prevent degradation of the composition by oxidation and a filler such as finely divided silica added in such an amount that no substantially adverse effect is caused on the photosensitivity of the composition with an object to improve the physical properties of the coating film formed of the composition by photocuring. It should be noted that, when the inventive photosensitive composition is used in the application to various electronic materials or devices among many other possible applications, each of the starting materials for the preparation of the components (a) and (b) as well as the additives including the component (c) must be extremely pure in respect of the impurities such as alkali metals, e.g. sodium and potassium, and halogens, e.g. chlorine, of which the impurity content should desirably be a few p.p.m. or smaller for each of the impurities in view of the very detrimental influence of these impurities on the performance of the electronic materials.

When a patterned layer of a polyimide resin film is to be formed on the surface of a substrate by use of the inventive photosensitive resin precursor or composition, a photolithographic technique can be applied including the steps of:

(i) providing the substrate on the surface with a thin film of the photosensitive resin precursor or composition by a suitable coating method;

(ii) exposing the surface layer of the precursor or composition on the substrate surface pattern-wise to actinic rays, e.g. ultraviolet light, to produce a solubility difference between the areas exposed and unexposed to the actinic rays;

(iii) developing, i.e. selectively dissolving away, the surface layer after pattern-wise exposure to actinic rays with an organic solvent in the unexposed areas where the resin precursor or composition still has a solubility in an organic solvent; and (iv) heating the pattern-wise layer on the substrate surface so as to form polyimide linkages in the resin precursor or composition after exposure to actinic rays which can be imparted with complete insolubility and stability thereby.

In the step (i) for forming a surface layer of the photosensitive resin precursor or composition on a substrate surface, the precursor or composition is, after dilution with a suitable organic solvent, if necessary, applied to the substrate surface by a known technique such as spraying, spincoating, dipping, printing and the like. When an organic solvent is used in this coating, the solvent of course must be removed by drying but heating of the coating layer for drying at an excessively high temperature is undesirable due to the partial formation of polyimide linkages to affect the solubility behavior thereof. Therefore, the drying temperature should not be higher than 150° C. or, preferably, 100° C.

The type of the actinic rays used in the step (ii) is not particularly limitative including ultraviolet light, electron beams, X-rays and the like although ultraviolet light is preferred which is conveniently obtained by use of various types of mercury lamps.

The development treatment in the step (iii) is performed by selectively dissolving away the resin precursor or composition on the areas unexposed to the actinic rays by use of an organic solvent as the developer liquid. Exemplary of preferable organic solvents are N-methyl-2-pyrrolidone, N-acetyl-2-(pyrrolidone, N,N-dimethylformamide, N,N-dimethylacetamide, dimethylsulfoxide, hexamethyl phosphoryltriamide, dimethyl imidazolidinone and N-benzyl-2-pyrrolidone. These solvents may be used either singly or as a combination of two kinds or more and it is further optional according to need to dilute the above named solvents with other organic solvent or solvents such as methyl alcohol, ethyl alcohol, isopropyl alcohol, benzene, toluene, xylene, ethyleneglycol monomethyl ether and the like. The relief pattern of the resin precursor or composition formed on the substrate surface by the development treatment is preferably rinsed prior to drying with a suitable rinse liquid which may be an organic solvent such as those above mentioned excepting those used in development.

The step (iv) is, so to say, a step of fixation by which polyimide linkages are formed by heating in the pattern-wise layer of the resin precursor or composition after pattern-wise exposure and development to impart heat resistance thereto. The heating treatment is performed at 150° to 450° C. for a length of time of 5 minutes to 4 hours. A preferable way of heating is to increase the temperature step-wise or continuously beginning at a relatively low temperature up to the highest temperature intended although the heating may be performed at a constant temperature throughout.

When the above described step (iv) is to be followed by an etching treatment, an etchant suitable for the purpose is exemplified by hydrazine, hydrazine hydrate and mixtures of hydrazine with ethylenediamine or an hydroxy compound such as amyl alcohol, octyl alcohol, ethyleneglycol, glycerin and the like. Mixtures of hydrazine and ethylenediamine are preferred.

The patterned layer of the organosilicon-containing polyimide resin formed of the inventive photosensitive resin precursor or composition has excellent heat resistance, adhesive bonding strength to the substrate surface, resistance against chemicals, electric insulation, mechanical properties and resolving power of pattern reproduction so that the inventive photosensitive resin precursor or composition is very useful in a wide variety of applications including, in particular, the use in the technology of electronics or semiconductors such as a material for forming a passivation film of semiconductors, insulative film on a multi-layer circuit of integral circuits and protective film for soldering on a printed circuit board as well as a material of a highly heat resistant photoresist capable of withstanding a molten metal and a condition in the process of dry etching if not to mention the application as a photoresist material of general purpose.

In the following, the photosensitive resin precursor and the composition of the invention are described in more detail by way of examples.

EXAMPLE 1

Into a reaction vessel were introduced 600 g of N-methyl-2-pyrrolidone, 49.3 g (0.25 mole) of 4,4'-diaminodiphenyl methane and 24.8 g (0.11 mole) of 1,1,3-trimethyl-1-(3-aminopropyl)-3,3-divinyl disiloxane to form a reaction mixture which was chilled at 2° to 3° C. and 98.2 g (0.305 mole) of 3,3',4,4'-benzophenone tetracarboxylic acid dianhydride were gradually added into the reaction mixture kept at 25° C. or below in the reaction vessel. After the end of the addition of the above mentioned dianhydride, the reaction mixture was kept for 5 hours at room temperature to complete the reaction followed by filtration of the mixture through a Millipore Filter having a pore diameter of 1 μm to give a product solution which is referred to as Product I hereinbelow. The reaction and the following treatment of the reaction mixture were performed in a stream of dry nitrogen gas in order to avoid intrusion of any atmospheric moisture.

EXAMPLE 2

Into a reaction vessel were introduced 178 g of N-methyl-2-pyrrolidone, 170 g of N,N'-dimethylformamide, 8.23 g of 1,1,3-trimethyl-1-(3-aminopropyl)-3,3-divinyl disiloxane, 14.56 g of 4,4'-diaminodiphenyl ether 3-carbonamide and 4.80 g of 4,4'-diaminodiphenyl ether to form a reaction mixture which was chilled at 2° to 3° C. and 14.52 g of pyromellitic acid dianhydride and 19.32 g of 3,3',4,4'-benzophenone tetracarboxylic acid dianhydride were gradually added into the reaction mixture kept at 25° C. or below. After the end of the addition of these dianhydrides, the reaction mixture was kept as such for 1 hour to complete the reaction and then filtered in the same manner as in Example 1 to give a product solution, which is referred to as Product II hereinbelow.

EXAMPLES 3 and 4

The reaction procedure in each of these examples was substantially the same as in Example 1 excepting the replacement of 24.8 g (0.11 mole) of 1,1,3-trimethyl-1-(3-aminopropyl)-3,3-divinyl disiloxane in Example 1 with 23.5 g of 1,1,3,3-tetramethyl-1-(3-aminopropyl)-3-vinyl disiloxane in Example 3 to give a product solution, which is referred to as Product III hereinbelow, and with 28.7 g of 1,1,3,3-tetramethyl-1-(3-aminopropyl)-3-(3-mercaptopropyl) disiloxane in Example 4 to give a product solution, which is referred to as Product IV hereinbelow.

EXAMPLE 5

A 50 g portion of each of the Products I and II obtained in Examples 1 and 2, respectively, was uniformly admixed with 0.1 g of dicumyl peroxide to give a photosensitive resin precursor solution which was applied to the surface of an aluminum plate by use of a spinner rotating at 3000 r.p.m. for 40 seconds followed by drying at 120° C. for 10 minutes.

The thus prepared photosensitive resin precursor film on the substrate surface was exposed to ultraviolet light emitted from a high-pressure mercury lamp having an output of 80 watts/cm held at a distance of 15 cm above the surface for 2 minutes through a photomask having line patterns of 10, 20 and 50 μm widths placed in direct contact with the photosensitive surface film followed by dipping in N-methyl-2-pyrrolidone for 5 minutes at room temperature to selectively dissolve away the resin precursor on the unexposed areas leaving a relief pattern of the polyimide precursor. The thus formed line pattern on the aluminum substrate was then baked by increasing the temperature stepwise first at 200° C. for 1 hour, then at 250° C. for 1 hour and finally at 250° C. for 1 hour. Microscopic inspection of the thus fixed line pattern indicated that the accuracy of line reproduction was quite satisfactory even for the lines of 10 μm width. The adhesive strength of the thus formed line pattern to the aluminum substrate surface was excellent and the line pattern could withstand a weathering test for 1000 hours at 80° C. under a relative humidity of 80% absolutely without peeling or other drawbacks.

EXAMPLE 6

A photosensitive resin precursor solution was prepared by uniformly mixing together 25 g and 23 g of the Products III and IV obtained in Examples 3 and 4, respectively, and 0.1 g of benzoin isobutyl ether and a photolithographic pattern reproduction test was undertaken with this solution in substantially the same manner as in Example 5 except that the exposure time was decreased to 60 seconds. The results of this test were as satisfactory as in Example 5.

EXAMPLE 7

A photosensitive composition was prepared by uniformly mixing together 50 g of the Product III obtained in Example 3, 2.04 g of 1,1,3,3-tetramethyl-1,3-di(3-mercaptopropyl) disiloxane and 0.1 g of benzoin isobutyl ether and a photolithographic pattern reproduction test was undertaken with this solution in substantially the same manner as in Example 5. The results of this test were as satisfactory as in Example 5.

EXAMPLE 8

Into a reaction vessel were introduced 469 g of N-methyl-2-pyrrolidone, 40.1 g (0.202 mole) of 4,4'-diaminodiphenyl methane and 20.8 g (0.0864 mole) of 1,1-dimethyl-1-(3-aminopropyl)-3,3,3-trivinyl disiloxane to form a reaction mixture which was chilled at 2° to 3° C. and 78.95 g (0.245 mole) of 3,3',4,4'-benzophenone tetracarboxylic acid dianhydride were gradually added to the reaction mixture kept at 25° C. or below. After the end of the addition of the dianhydride, the reaction mixture was kept as such for 5 hours at room temperature to complete the reaction and filtered in the same manner as in Example 1 to give a product solution which is referred to as Product V hereinbelow.

EXAMPLE 9

A photosensitive composition was prepared by uniformly mixing together 100 g of the Product V obtained in Example 8, 0.1 g of dicumyl peroxide and 2.0 g of 1,3,5,7-tetramethyl-1,3,5,7-tetra(3-mercaptopropyl) cyclotetrasiloxane and an aluminum plate was coated with this solution by use of a spinner rotating at 3000 r.p.m. for 40 seconds followed by drying at 105° C. for 5 minutes. Photolithographic pattern reproduction test was performed with this coated plate in substantially the same manner as in Example 5 except that the distance between the ultraviolet lamp and the coated plate was 10 cm and the exposure time was 18 seconds. The results of this test were as satisfactory as in Example 5.

What is claimed is:

1. An organosilicon-containing polyamic acid which is a reaction product of the reactants:

(a-1) an organosilicon compound represented by the general formula

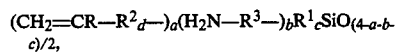

in which R is a hydrogen atom or a methyl group, $R^1$ is an unsubstituted monovalent hydrocarbon group selected from the class consisting of alkyl, aryl, and alkoxy, a monovalent hydrocarbon group selected from the class consisting of alkyl, aryl, and alkoxy substituted with halogen, glycidyloxy, and cyano, $R^2$ is a divalent organic group selected from the class consisting of polymethylene groups of the formula $-CH_2)_p$, in which p is a positive integer, propylene group of the formula $-CH_2-CHMe-$, in which Me is a methyl group, 1,4-phenylene group and an ester group of the formula $-CO-O-C_3H_6-$, $R^3$ is a divalent hydrocarbon group, a and b are each a positive number not exceeding 3 and c is zero or a positive number not exceeding 2 with the proviso that a+b+c is a positive number not exceeding 4 and d is zero or 1;

(a-2) a tetracarboxylic acid dianhydride represented by the general formula

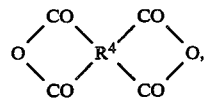

in which $R^4$ is a tetravalent hydrocarbon group; and (a-3) a polyamino compound represented by the general formula

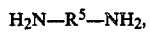

which is a diamino compounds, or

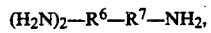

which is a diaminoamide compound, in which $R^5$ is a divalent organic group, $R^6$ is a tervalent hydrocarbon group and $R^7$ is a sulfonyl group $-SO_2-$ or a carbonyl group $-CO-$; in an organic solvent.

2. The organosilicon containing polyamic acid as claimed in claim 1 wherein the amount of the reactant (a-2) in the reaction with the reactants (a-1) and (a-3) is in the range from 0.4 to 0.6 mole per mole of the amino groups in the reactants (a-1) and (a-3).

* * * * *